US005562991A

United States Patent [19]
Tannenbaum

[11] Patent Number: 5,562,991
[45] Date of Patent: Oct. 8, 1996

[54] UNIVERSAL PRIMER FOR NON-STICK FINISH

[75] Inventor: Harvey P. Tannenbaum, Wynnewood, Pa.

[73] Assignee: E. I. Du Pont de Nemours and Company, Wilmington, Del.

[21] Appl. No.: 331,843

[22] Filed: Oct. 31, 1994

[51] Int. Cl.$^6$ .................................................. B32B 27/00
[52] U.S. Cl. ........................ 428/421; 428/458; 428/463; 428/446; 428/450; 428/428; 428/461
[58] Field of Search ................................ 428/421, 458, 428/463, 428, 446, 450, 461

[56] References Cited

U.S. PATENT DOCUMENTS

| | | | |
|---|---|---|---|
| 3,920,793 | 11/1975 | Teti et al. | 428/215 |
| 4,087,394 | 5/1978 | Concannon | 260/29.6 F |
| 4,118,537 | 10/1978 | Vary et al. | 428/422 |
| 5,079,073 | 1/1992 | Tannenbaum | 428/422 |
| 5,106,682 | 4/1992 | Matsushita et al. | 428/421 |
| 5,223,343 | 6/1993 | Tannenbaum | 428/422 |
| 5,240,775 | 8/1993 | Tannenbaum | 428/422 |
| 5,250,356 | 10/1993 | Batzar | 428/421 |

FOREIGN PATENT DOCUMENTS

WO94/14904  12/1993  WIPO .

*Primary Examiner*—Mark D. Sweet

[57] ABSTRACT

A primer layer for fluoropolymer non-stick coating is provided, which comprises a fluoropolymer such as PTFE, a polymer binder such as polyamic acid salt, and inorganic film hardener such as silicate compound, wherein the weight ratio of fluoropolymer to binder is 0.5 to 2.0:1 and the amount of film hardener is 5 to 30 wt % based on the weight of the baked composition. This primer layer adheres to a wide variety of smooth surfaces such as stainless steel and glass, and to the fluoropolymer overcoat on the primer layer, and provides durabilty to the coating.

13 Claims, No Drawings

UNIVERSAL PRIMER FOR NON-STICK FINISH

FIELD OF THE INVENTION

This invention relates to primers for fluoropolymer coatings.

BACKGROUND OF THE INVENTION

U.S. Pat. No. 4,087,394 (Concannon) discloses an aqueous dispersion of certain fluoropolymers, which dispersion contains dissolved film-forming material (binder) for forming a non-stick coating. Example 1 discloses the preparation of such a dispersion, containing 51 wt % TFE/HFP copolymer, 32 wt % polyamide acid salt (also called polyamic acid), 13.9 wt % carbon black pigment, and 2.3 wt % aluminum silicate extender supplied as part of the black pigment mill base and present as a grinding aid therein. The weight proportion of fluoropolymer to binder was 1.6:1. This dispersion was applied to an aluminum sheet and baked to a coating having excellent release properties. In the baking process, the coating composition is disclosed to tend to stratify, with the binder concentrating at the substrate surface to provide adhesion of the coating to it, and the fluoropolymer concentrating at the outer surface to provide the release property.

The aqueous dispersion approach of Concannon for creating the non-stick coating has been widely adopted for the creation of primer layers for overcoating with at least one fluoropolymer layer to produce non-stick finishes. In the primer application, the fluoropolymer concentrating at the top surface of the primer layer provides inter-coat adhesion to the fluoropolymer overcoat.

With the use of the Concannon approach in providing primer coating, several additional measures were taken. First, for improved release and easy clean, higher film builds (thickness) for the overcoat, i.e. a midcoat and a topcoat, each being primarily fluoropolymer, were used. Second, to obtain good intercoat adhesion between the primer layer and the midcoat, the weight ratio between fluoropolymer and binder in the primer layer was kept high, 2.4 and higher. Third, to obtain adequate adhesion of the primer layer, the substrate was roughened, e.g. by grit blasting when the substrate was metal and pre-coating of the substrate with a glass flit when the substrate was ceramic, e.g. enamel. This toughening provided a mechanical bond of the primer to the substrate in addition to the adhesion provided by the binder component of the primer layer.

In addition to providing improved adhesion, it became desirable to improve durability of the non-stick coating, and this was accomplished by adding inorganic filler film hardener, such as clay, to the fluoropolymer overcoat.

It became desirable to eliminate the step of roughening the substrate, which would require the primer to have the sole responsibility for achieving adhesion. Recent patents disclose the achievement of providing primers for non-stick finishes on certain smooth substrate surfaces, by controlling the stratification occurring during baking of the primer layer. U.S. Pat. Nos. 5,168,013 and 5,240,775 (both by Tannenbaum) disclose that the fluoropolymer component should be composed of polytetrafluoroethylene (PTFE) of low and high melt viscosity or of PTFE and a TFE/PAVE copolymer, respectively. PCT publication WO 94/14904 (Thomas) discloses the fluoropolymer component to be two different perfluorocarbon resins generally having lower melt viscosity than the Tannenbaum PTFE and the binder component to be two different binders in certain ratios. The primers prepared in these references were applied to smooth degreased aluminum and had fluoropolymer to binder weight ratios of 2.5, 2.4, and 1.5, respectively.

This adhesion to certain smooth surfaces was achieved by not having filler film hardener present in the primer composition in any amount which could noticeably increase primer layer durability, with the attendent adverse effect of adhesion to the substrate. In Example 1 of Thomas the aluminum silicate is present as an extender (grinding aid) for the carbon black pigment, and its amount is only 3.2 wt % based on solid material present. The colloidal silica component (7.4 wt %) an adhesion promoter, has also been used as a binder (U.S. Pat. No. 4,118,537 to Vary et. al.), and indeed this component is not used as a filler film hardener; it has a much finer particle size than filler, viz. less than 0.1 micrometer as compared to filler particles which are generally at least one micrometer in size (colloidal silica in water looks like a clear liquid).

When filler film hardener was added to the primer layer composition to toughen the overall non-stick finish by the primer layer resisting scratches which penetrated the overcoat, the primer layer would no longer adhere adequately to a smooth substrate. In a commercial primer having a fluoropolymer/binder weight ratio of 2.4:1, incorporation of aluminum oxide film hardener into the primer reduced the adhesion to the substrate such that the substrate had to be roughened to achieve adequate adhesion (U.S. Pat. No. 5,250,356 to Batzer).

The need remains for a primer for non-stick coatings which has both durability, adequate adhesion to smooth substrate, and adequate adhesion to a fluoropolymer overcoat.

SUMMARY OF THE INVENTION

The present invention satisfies this need. More specifically, the present invention provides a composition which is applicable as a primer for non-stick coating on a substrate, comprising fluoropolymer and polymer binder in the weight proportion of 0.5 to 2.0:1 and in addition, from 5 to 30 wt % of inorganic filler film hardener, based on the weight of the composition (primer layer) after baking.

This composition is preferably in the form of an aqueous dispersion of the polymer and the film hardener, with the binder being in solution. When applied to a substrate as a primer layer, followed by overcoating with a fluoropolymer-containing composition, the composition of the present invention provides durability to the resultant composite structure of substrate, primer, fluoropolymer overcoat, high adhesion to the substrate even when smooth surfaced, and high adhesion between the primer layer and overcoat.

It is unexpected that the in presence of relatively small proportion of fluoropolymer and large proportion of film hardener component that both high adhesion to smooth substrates and high intercoat adhesion can be achieved, especially when the fluoropolymer/binder weight ratio is no greater than 1.4:1 and even no greater than 1.2: 1.

The composition of the present invention also exhibits the unexpected attribute of relative universality of application as an adherent primer to a wide variety of smooth substrates, e.g. aluminum, cold-rolled steel, stainless steel, and ceramics, such as glass, enamel, and pyroceram, i.e. the surface roughening commonly used especially with cold-rolled steel, stainless steel, and ceramics is not necessary. In the case of cold-rolled steel, this is particularly valuable contribution, because the roughened steel surface is prone to rusting, especially in proximity or contact with water from the aqueous coating medium, and this can be avoided by the composition of the present invention. The primer also adheres very well to anodized aluminum, wherein the resultant aluminum oxide surface may be considered as a ceramic substrate. Thus, the present invention also includes the composite structure formed from primer of the present invention on the substrate surface and overcoat of fluoropolymer to provide the non-stick surface, with the surface of the substrate being preferably smooth.

DETAILED DESCRIPTION

The fluoropolymer component of the composition of the present invention is preferably polytetrafluoroethylene (PTFE) for simplicity of formulating the composition and the fact that PTFE provides the highest heat stability among the fluoropolymers. Such PTFE can also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoropropylvinyl ether (PPVE) being preferred. The amount of such modifier will be insufficient to confer melt-fabricability to the PTFE, generally being no more than 0.5 mole %. The PTFE, also for simplicity, can have a single melt viscosity, usually at least $1\times10^9$ Pa·s, but a mixture of PTFEs having different melt viscosities can be used to form the fluoropolymer component.

While PTFE is preferred, the fluoropolymer component can also be melt fabricable fluoropolymer, either combined (blended) with the PTFE, or in place thereof. Examples of such melt-fabricable fluoropolymers include TFE copolymers with one or more of the comonomers described above for the modified PTFE but having sufficient comonomer content to reduce the melting point significantly below that of PTFE. Commonly available melt-fabricable TFE copolymers include FEP (TFE/HFP copolymer) and PFA (TFE/PAVE copolymer), notably TFE/PPVE copolymer. The molecular weight of the melt-fabricable terafluoroethylene copolymers is unimportant except that it be sufficient to be film-forming and be able to sustain a molded shape so as to have integrity in the primer application. Typically, the melt viscosity of FEP and PFA will be at least $1\times10^2$ Pa·s and may range up to about $60-100\times10^3$ Pa·s as determined at 372° C. according to ASTM D-1238.

The fluoropolymer component is generally commercially available as a dispersion of the polymer in water, which is the preferred form for the composition of the invention for ease of application and environmental acceptability. By "dispersion" is meant that the fluoropolymers particles are stably dispersed in the aqueous medium, so that settling of the particles does not occur within the time when the dispersion will be used; this is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

The binder component is composed of polymer which is film-forming upon heating to fusion and is also thermally stable. This component is well known in primer applications for non-stick finishes, for adhering the fluoropolymer-containing primer layer to substrates and for film-forming within and as part of the primer layer. The fluoropolymer by itself has little to no adhesion to a smooth substrate. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluorocarbon component in the aqueous dispersion form.

An example of the binder component is polyamic acid salt which converts to polyamideimide upon baking of the composition to form the primer layer. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion.

Another example of the binder component is polyethersulfone, which can have sparing water solubiluty but which can be dissolved in an organic solvent such as N-methylpyrrolidone which is miscible with water, with the resultant solution being uniformly blendable with the fluoropolymer aqueous dispersion. Polyethersulfones are amorphous thermoplastic polymers with a glass transistion temperature of about 230° C. and a sustained service temperature of about 170° C. to 190° C.

In another embodiment of the present invention, the composition is in the form of an organic solvent such as N-methylpyrrolidone which contains as a dispersion, the fluoropolymer such as PTFE micropowder, having a melt viscosity in the range of $1\times10^2$ to $1\times10^7$ Pa·s, the binder such as polyamic acid, polyphenylene sulfide, polyetherether ketone, or polyethersulfone, and the filler film hardener, preferably with at least a portion of the binder dissolved in the organic solvent, and surfactant. This embodiment is especially useful for applying a primer layer to metal strip, which is called coil coating. The PTFE micropowder can be made by aqueous dispersion polymerization so that it can be in a form which is convenient to use in the embodiment of this invention in which the composition is in the form of an aqueous dispersion.

For simplicity, only one binder need be used to form the binder component of the composition of the present invention.

The proportion of fluoropolymer and binder in compositions of the present invention are preferably in the weight ratio of 0.8 to 1.2: 1. The weight ratios of fluoropolymer to binder disclosed herein are based on the weight of these components in the primer layer formed by baking the composition after application to its substrate. The baking drives off the volatile materials present in the coating composition, including the salt moiety of the polyamic acid salt as the imide bonds are formed during baking. For convenience, the weight of binder, when it is polyamic acid salt which is converted to polyamideimide by the baking step, can be taken as the weight of polyamic acid in the starting composition, whereby the weight ratio of fluoropolymer to binder can be determined from the amount of fluoropolymer and binder in the starting composition. When the composition of the invention is in the preferred aqueous dispersion form, these components will will constitute about 5 to 50 wt % of the total dispersion.

The inorganic filler film hardener component is one or more filler type materials which are inert with respect to the other components of the composition and thermally stable at its eventual baking temperature which fuses the fluoropolymer and binder. Preferably, the film hardener is water insoluble so that it is uniformly dispersible but not dissolved in the aqueous dispersion form of the composition of the invention. By filler-type material means that the material is finely divided, generally having a particle size of 1 to 100 micrometers, preferably 2 to 20 micrometers, which is usually obtained by the film hardener component imparts durability to the primer layer by resisting penetration of sharp objects that have penetrated the fluoropolymer overcoat, which results from both the hardness or toughness of the material itself and the amount of it that is present in the composition.

Examples of the film hardener include the silicate compounds such as metal silicate, e.g. aluminum silicate, and metal oxides such as titanium dioxide. Silicate compounds have molecular formulae with varying amounts of particular anion moieties present; this invention is not limited to any particular silicate molecular formula.

For simplicity, only one film hardener need be used. Thus, the present invention contemplates a simplified composition wherein the essential ingredients insofar as adhesion to the substrate and the overcoat and durability are concerned, are a single fluoropolymer, preferably PTFE, a single binder, preferably polyamic acid salt, and a single film hardener, metal silicate, preferably aluminum silicate. In the fused form, as the primer layer on a substrate of a composite structure, the same simplified composition will exist, except that the polyamic acid salt will be polyamideimide.

The use of small amounts of the film hardener in the composition, e.g. less than 5 wt %, based on the combined weight of fluoropolymer, binder, and film hardener, has little effect on durability of the primer layer. Preferably the proportion of the film hardener in the primer layer is from 10 to 30 wt % and more preferably, from 15 to 30 wt %, all based on the weight of the baked composition.

The composition of the present invention will usually contain pigment in preferably a mill base medium that is either soluble in or miscible with the water of the fluoropolymer aqueous dispersion.

The pigment mill base is produced by milling (grinding) pigment in its liquid medium, which produces uniformity and small pigment size. The preferred medium is water which contains surfactant so that the pigment mill base becomes an aqueous dispersion of the pigment by the milling process In a preferred embodiment of the present invention, the film hardener and solution of binder is coground with the pigment to form the aqueous dispersion of pigment containing dissolved binder. It has been found that this co-grinding increases both the durability of the non-stick finish and the adhesion of the primer layer to the substrate, and this is another unexpected result of the present invention.

The co-grinding reduces the particle size of the pigment and the filler film hardener, whether by deagglomeration or size reduction of unagglomerated particles, e.g. the particles after co-grinding are smaller than the particles prior to co-grinding. Co-grinding produces the preferred film hardener particle size range of 2 to 10 micrometers. The particular manner of co-grinding and the length of time that it is carried out is unimportant so long as the particles are made smaller, and the results of appreciable improvement in adhesion to the substrate and durability is obtained; that is to say that the co-grinding is carried out in an effective amount to produce this result.

In the embodiment of the present invention when the finish composition is in organic solvent medium, and no aqueous dispersion of fluoropolymer is involved, i.e. the fluoropolymer is contained in the organic solvent, all of the ingredients can be co-ground together—the fluoropolymer, pigment, binder, and film hardener—to bring about the improved results.

The composition of the present invention in aqueous dispersion form may also contain such other additives as adhesion promoters, such as colloidal silica and a phosphate compound, such as metal phosphate, e.g. Zn, Mn, or Fe phosphate, the phosphate compound also being useful in the embodiment wherein the composition is in an organic solvent medium. The phosphate in combination with silicate film hardener provides appreciable improvement in the adhesion of the primer layer to the substrate even without the co-grinding step being used. The amount of metal phosphate which can be advantageously used is about 1/10 to 1/2 the weight amount of the metal silicate.

The composition of the present invention can be applied to substrates by conventional means. Spray and roller application are the most convenient application methods, depending on the substrate being coated. An overcoat of one or more fluoropolymer-containing layers can then be applied by conventional methods to the primer layer prior to its drying. The overcoat can consist for example of a midcoat and a topcoat, with different compositions to provide the durability, non-stick and appearance effect desired. At least the midcoat would contain film hardener to start the protection against scratching at a layer above the primer layer. When the primer and overcoat layer compositions are aqueous dispersions, the overcoat composition can be applied to the primer layer preferably after drying to touch. When the primer layer is made by applying the composition from an organic solvent, and the next layer (midcoat or topcoat) is applied from an aqueous medium, the primer layer should be dried so that all water-incompatible solvent is removed before application of such next layer.

The resultant composite structure can be baked to fuse all the coatings at the same time to form the non-stick coating on the substrate. When the fluoropolymer is PTFE, a quick high bake temperature is preferred, e.g. for 5 min. at a temperature starting at 800° F. (427° C.) and rising to 825° F. (440° C.). When the fluoropolymer in the primer or the overcoat is a blend of PTFE and FEP, e.g. 50–70 wt % PTFE and 50–30 wt % FEP, the bake temperature may be reduced to 780° F. (415° C.), rising to 800 F. (427° C.) in 3 minutes (total bake time). The baked primer layer thickness will generally be between 5–15 micrometers, and the overcoat layer thickness will generally be from 10–20 micrometers for both the midcoat layer and the topcoat layer.

In the resultant composite structure, the substrate can be of any material which can withstand the bake temperature, such as metal and ceramics, examples of which include aluminum, anodized aluminum, cold-rolled steel, stainless steel, enamel, glass, and pyroceram. The substrate can be smooth and needs to be clean. For pyroceram and some glass, improved results are obtained by activation of the substrate surface such as by a slight chemical etch, which is not visible to the naked eye, i.e. the surface is still smooth. The substrate can also be chemically treated with an adhesion agent such as a mist coat of polyamic acid salt, such as disclosed in U.S. Pat. No. 5,079,073 to Tannenbaum. The primer layer can be considered as the first fluoropolymer-containing layer on the substrate, and preferably the primer layer is directly bonded to the substrate.

Products have non-stick finishes made using primer compositions of the present invention include cookware, bakeware, rice cookers and inserts therefor, water pots, iron sole plates, conveyors, chutes, roll surfaces, cutting blades, etc.

In the following Examples, the substrates are all smooth, characterized by a surface profile of less than 50 microinches (1.25 micrometers) as measured by a model RT 60 surface roughness tester made by Alpa Co. of Milan, Italy. Durability and adhesion can be measured by any test which discriminates between adequate and inadequate results for various coatings.

a. In the present case, durability is determined by the "tiger paw" abuse test wherein the coated substrate is continuously scratched with multiple ball point pen tips which are held by a weighted holder (400 g total weight) which rotates the pens against and around the surface of the coated substrate. To accelerate the failure of the entire thickness of the coating, i.e. the rotation of the pens produces a continuous circular-shaped path penetrating the entire coating to reach the substrate, the substrate is heated at 205° C. during this scratch test, and the time to such failure is recorded. The longer the time to failure, the better the durability of the non-stick coating.

b. Adhesion of the primer layer to the substrate and to the overcoat was qualitatively determined first by the ability of the non-stick coating to remain tightly adhered to the substrate after baking and cooling, despite the stresses created by the coating wanting to shrink more than the substrate and second, by whether the "tiger paw" abuse test either causes inter-layer separation or separation of the primer layer from the substrate by the pen tips abrading the coatings on the substrate. In this sense, the "tiger paw" abuse test tests the overall durability of the coating—both scratch resistance and adhesion to the substrate and between layers. Additional testing of adhesion is described in the Examples.

c. All the testing is done with a midcoat and topcoat applied to the primer layer, all applications being done by spraying. The midcoat had the composition which is essentially the same as set forth in Table 2 of U.S. Pat. No. 5,240,775, except that the 40.704 wt % of PTFE was a blend of 85 wt % PTFE and 15 wt % PFA. The topcoat composition was essentially the same as the topcoat composition set forth in the Table bridging cols. 2 and 3 of U.S. Pat. No. 5,250,356, except that the 71.5 wt % PTFE was a blend of 95 wt % PTFE and 5 wt % PFA.

d. The primer composition used was in the form of an aqueous dispersion having the following ingredients:

|  | Weight Percent |
| --- | --- |
| black pigment | 2.025 |
| ultramarine blue pigment | 1.408 |
| Ludox ® colloidal silica | 0.909 |
| PTFE (solids in aqueous disp.) | 4.170 |
| polyamic acid | 4.195 |
| aluminum silicate | 3.323 |
| ferric phosphate | 0.820 |
| Tamol ® SN surfactant | 0.284 |

-continued

|  | Weight Percent |
| --- | --- |
| dionized water | 72.344 |
| triethanolamine | 0.069 |
| Triton ® X-100 surfactant | 0.713 |
| diethylethyl alcohol amine | 0.592 |
| triethyl amine | 1.184 |
| furfuryl alcohol | 3.587 |
| N-methylpyrrolidone (NMP) | 4.330 |

Any variations of this composition will be disclosed in the Examples.

e. Unless otherwise indicated, the aqueous dispersion of d. was made by co-grinding of the pigment, aluminum, silicate, polyamic acid salt prepared by reacting the polyamic acid with the triethyl amine in NMP/furfuryl alcohol, and the ferric phosphate in water in a Netzch® mill under the following conditions: 80% load of glass balls, pump rate of 90 rpm, agitator shaft speed rpm, and dispersion throughput of 30 gal/hr (0.0038m$^3$/hr). The aluminum silicate had the largest particle sizes at the start of co-grinding, and its average particle size was reduced to 3 to 7 micrometers by the co-grinding. All of the liquid ingredients of the composition of d. were present in the co-grind medium except for the Ludox®, ferric phosphate, and Triton® X-100. The resultant aqueous dispersion was then blended with the PTFE aqueous dispersion and remaining ingredients until uniformly dispersed in a mixing tank having an agitator blade operating at 70 rpm to form the dispersion of d. Additional water and NMP are added to adjust viscosity to 100 to 250 centipoises measured at 25° C.

EXAMPLES

EXAMPLE 1

Non-stick coating was formed on clean but not etched Pyrex® glass plates measuring 4 by 6 inches (10.16×15.24 cm) using the primer composition of d., except that aluminum silicate and ferric phosphate were not present in the composition, followed by baking and scoring the coating through its thickness with a razor blade around the edge of the plate, spaced about ¼ in (0.636 cm) from the edges of the plate, to start edge separation of the coating from the plate. Adhesion was then tested by vertically suspending the coated/scored plate in boiling water. The coating immediately came off of the plate.

Repetition of the experiment in the preceding paragraph except that the aluminum silicate film hardener was included in the primer layer composition, led to the coating surviving 30 min. in the boiling water before separating from the plate. Surprisingly, the presence of the large amount of aluminum silicate in the composition improved its adhesion to the Pyrex® glass plate.

Repetition of the experiment in the preceding paragraph except that ferric phosphate was also included in the primer layer composition, led to the coating surviving the boiling water for much more than 30 min.

EXAMPLE 2

In this series of experiments, adhesion of the non-stick coating on frying pans was tested by cross-hatching the coating with a razor blade to form a' 10×10 matrix of ⅛ in (0.3 175 cm) squares, immersing the frying pans in water heated at 195° F. (90.5° C.) and containing 0.3 wt % detergent for 16 hours. After this immersion exposure, the non-stick coating was dried and the cross-hatch matrix was subjected to tape (3M type 610) removal in all directions. If less than 3 squares from the matrix were removed by the tape in any direction, the coating was considered to pass this immersion test.

When the primer layer composition was that of d. above, the non-stick coating passed this immersion test on frying pans having smooth cold-rolled steel, stainless steel, anodized aluminum, cast iron, glass, and lightly etched pyroceram surfaces for receiving the coating.

When the proportion of fluoropolymer in the primer layer composition was increased so as to provide a fluoropolymer to binder weight ratio of 1.5:1, the resultant coating also passed this immersion test.

When the proportion of fluoropolymer in the primer layer composition was increased so as to provide a fluoropolymer to binder weight ratio of 2.4, the resultant coating failed the immersion test.

The scratch resistance as well as adhesion of the non-stick coating was tested by the "tiger paw" abuse test, with a time until failure exceeding 90 minutes being desired. For the non-stick coating wherein the primer layer composition of d. was used on all of the substrates mentioned previously in this EXAMPLE, the time until failure exceeded 90 minutes. Lightly etched non-stick coated pyroceram for example exceeded 100 minutes. Non-stick coated stainless steel exceeded 135 minutes.

When the primer layer composition of d. was prepared by the separately milling the pigment and the film hardener and not having binder solution present in either milling operation, followed by blending the aqueous fluoropolymer dispersion with the binder solution, the film hardener aqueous dispersion, and the pigment aqueous dispersion, the resultant non-stick coating failed the "tiger paw" abuse test in less than 60 minutes.

What is claimed is:

1. Composition applicable as a primer for non-stick coating on a smooth substrate, comprising a single fluoropolymer and polymer binder in the weight proportion of 0.5 to 2.0:1 and in addition from 5 to 30% inorganic filler film hardener, based on the baked weight of the composition.

2. The composition of claim 1 contained in a liquid medium.

3. The composition of claim 1 wherein said ratio is 0.8 to 1.2:1.

4. The composition of claim 1 wherein the fluoropolymer is polytetrafluoroethylene.

5. The composition of claim 1 in the form of a baked layer on a substrate.

6. Composition structure comprising a smooth substrate, a fused layer of a composition comprising fluoropolymer and polymer binder in the weight proportion of 0.5 to 2.0:1 and in addition from 5 to 30 wt % inorganic filler film hardener, based on the baked weight of the composition adhered to said substrate, and at least one fluoropolymer-containing fused layer on top of an adhered to said first-mentioned fused layer of the composition of claim 1 to form a non-stick coating on said substrate.

7. The composite structure of claim 6 wherein said smooth substrate is pyroceram and said pyroceram is lightly etched, not visible to the naked eye, to improve adhesion of said coating thereto.

8. Composition applicable as a primer for non-stick coating on a smooth substrate, comprising fluoropolymer and polymer binder in the weight proportion of 0.5 to 1.4:1 and in addition from 10 to 30 wt % inorganic filler film hardener, based on the baked weight of the composition, wherein said fluoropolymer is polytetrafluoroethylene.

9. The composition of claim 8 in the form of a baked layer on said smooth substrate.

10. Composition applicable as a primer for non-stick coating on a substrate, comprising fluoropolymer and polymer binder in a weight proportion of 0.5 to 2.0:1 and in addition, form 5 to 30 wt % of inorganic film hardener which is silicate compound, based on the baked weight of the composition.

11. Composition applicable as a primer for non-stick coating on a substrate, comprising fluoropolymer and polymer binder in a weight proportion of 0.5 to 2.0:1 and in addition, from 5 to 30 wt % of inorganic film hardener, based on the baked weight of the composition, and adhesion promoter which is phosphate compound.

12. Composition of claim 10 and in addition, adhesion promoter which is phosphate compound.

13. The composition of claim 12 in the form of a baked layer.

* * * * *

UNITED STATES PATENT AND TRADEMARK OFFICE
CERTIFICATE OF CORRECTION

PATENT NO. : 5,562,991
DATED : October 8, 1996
INVENTOR(S) : Harvey P. Tannenbaum It is certified that error appears in the above-indentified patent and that said Letters Patent is hereby corrected as shown below:

Column 10, claim 6, line 8, delete "of the composition of claim 1".

Column 10, claim 10, change "form" to -- from--.

Signed and Sealed this

Seventeenth Day of December, 1996

Attest:

BRUCE LEHMAN

*Attesting Officer*  *Commissioner of Patents and Trademarks*